No. 801,205. PATENTED OCT. 10, 1905.
A. R. BEAL.
REGISTER AND MECHANISM THEREFOR.
APPLICATION FILED JULY 12, 1904. RENEWED MAR. 3, 1905.
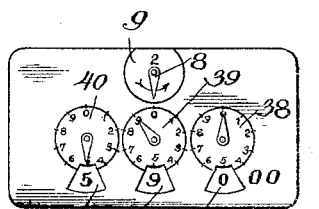
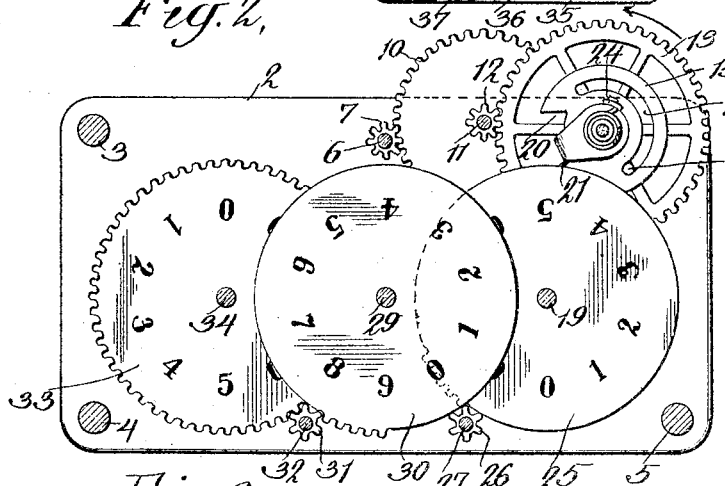
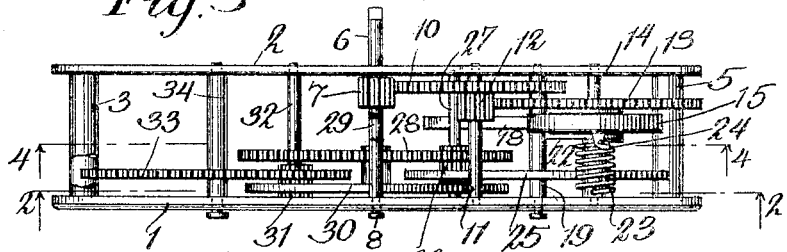
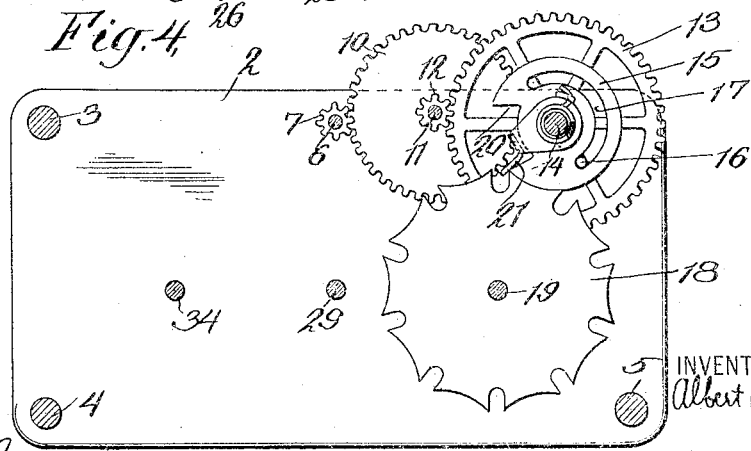
WITNESSES:
INVENTOR
Albert R. Beal
BY
Nicholas M. Goodlett
his ATTORNEY

UNITED STATES PATENT OFFICE.

ALBERT R. BEAL, OF NEWBURGH, NEW YORK.

REGISTER AND MECHANISM THEREFOR.

No. 801,205.    Specification of Letters Patent.    Patented Oct. 10, 1905.

Application filed July 12, 1904. Renewed March 3, 1905. Serial No. 248,221.

*To all whom it may concern:*

Be it known that I, ALBERT REYNOLDS BEAL, a citizen of the United States, and a resident of Newburgh, county of Orange, State of New York, have invented certain new and useful Improvements in Registers and Mechanism Therefor, of which the following is a specification.

This invention relates to registers for measuring purposes.

It also relates to a train of gearing especially adapted for use in a register, but also adapted for other purposes.

In the specific embodiment of the invention as shown in the accompanying drawings the improvements are shown as applied to a register for measuring the flow of gas or other fluids.

The invention consists of the combinations of features hereinafter set forth.

In the drawings forming part of this invention, and in which like reference-numerals designate corresponding parts in the several views, Figure 1 is a front elevation of a register for measuring the flow of gas and embodying the invention. Fig. 2 is a sectional elevation on the line 2 2 of Fig. 3. Fig. 3 is a plan view. Fig. 4 is a sectional elevation on the line 4 4 of Fig. 3. Fig. 5 is an end elevation of Fig. 4, and Fig. 6 is a perspective view of the driving-tooth.

1 and 2 are the front and back plates of the register, secured together by suitable pillars 3, 4, and 5. The initial spindle 6, on which is fixed the pinion 7, is actuated by the fluid or other thing to be measured and carries a hand 8, turning on a dial 9 on the face-plate 1. Each rotation of the spindle 6 indicates on dial 9 the flow of two feet of gas. This spindle 6 and its six-toothed pinion 7 connects with wheel 10, fixed on spindle 11, which carries pinion 12, gearing with wheel 13, fixed on spindle 14. Loose on spindle 14 is a wheel 15, free to make a partial rotation on spindle 14. Various means may be employed for thus connecting the wheel 15 and this spindle 14. In the preferred arrangement and as shown this is accomplished by a pin 16, fixed on the wheel 14 and entering the slot 17 in the wheel 15, the wheel 15 being movable on the spindle as far as the pin moves in the slot. The wheel 15 is a locking and releasing wheel for the wheel 18, carried on the spindle 19. There are various ways of constructing the wheels 15 and 18 so that the former may perform its function of locking and releasing wheel 18. In the preferred arrangement, however, the wheel 18 is a "geneva" gear, and the wheel 15 has a smooth portion and a recessed portion 20, as shown, the smooth portion engaging the periphery of wheel 18 to lock the latter and the recessed portion operating to release wheel 18. Associated with wheel 15 is a tooth 21, loosely carried on the spindle 14 and arranged to intermittently engage or mesh with the wheel 18 when the latter is released by wheel 15. This tooth, it will be seen, has an independent movement, and in the best arrangement it projects from recess 20, which limits the independent movement of the tooth. The tooth 21 preferably has a bifurcated shank 22, which embraces the wheel 15. In order that the driving-tooth 21 may actuate the wheel 18 by a snap movement, this tooth 21 is made so as to be a spring-tooth. There are various arrangements by which this spring function of the tooth may be obtained. The arrangement which I deem best, however, is that shown in the drawings. In this arrangement a coiled spring 23 surrounds spindle 14 and has one end fixed to the spindle and the other end secured to ear 24 on tooth 21. As the spindle 14 and wheel 13 rotate spring 23 is gradually put under tension until the pin 16 reaches the farther or forward end of slot 17, whereupon wheel 15 by a further rotation of spindle 14 is moved from its locking to its releasing position. This permits tooth 21 by its spring function to impart a snap movement of one step to wheel 18. Moreover, inasmuch as the spring tension on tooth 21 is made to bear on wheel 15 at the forward end of recess 20 wheel 15 is also carried around with a snap movement, so that the smooth portion of its periphery again locks wheel 18. The spring 23 is initially put under tension when mounted in place, so that it presses tooth 21 against the forward end of recess 20. This of course causes wheel 15 to assume such a position on its spindle that pin 16 is at the rear end of slot 17, except when tooth 21 is bearing against wheel 18.

Fast on the spindle 19 is a wheel 25, which has five teeth and a periphery otherwise smooth. 26 is a pinion fixed on the spindle 27 and engaged by the wheel 25 and meshing with the gear 28, fixed on the spindle 29, which spindle also carries the fixed five-toothed wheel 30 similar to wheel 25. The wheel 30 engages the pinion 31, fixed on spindle 32, and the pinion 31 meshes with and drives the gear-wheel 33, fixed on spindle 34. The spindles 19, 29, and 34 carry the disks or wheels on which are marked the counting characters of the register, displayed through the windows 35, 36, and 37. These same spindles may also, as shown in the drawings, carry hands which move over dials 38, 39, and 40 in unison with the counter-wheels. In the simplest arrangement these counter-wheels are provided by marking the counting characters directly on the wheels 25, 30, and 33. In this way the necessity of having extra counter-wheels in addition to the wheels 25, 30, and 33 is avoided, these wheels being made to serve a double purpose.

It is to be noted that at each tenth step of wheel 25, or at the end of each rotation thereof, its teeth mesh with and drive the pinion 26 one complete rotation, which in turn drives the wheel 28, thereby causing the counter-wheel 30 to move a tenth of a rotation, or one step. Likewise at each tenth step of the wheel 30, or at the end of each rotation thereof, its teeth mesh with and drive the pinion 31 one complete rotation, which in turn drives the counter-wheel 33 one-tenth of a rotation, or one step. Thus the wheel 33, or the tens-of-thousands counter-wheel, moves one step upon a predetermined movement or the tenth step of the thousands-wheel 30, and the thousands-wheel 30 moves one step upon a predetermined movement or the tenth step of the hundreds-wheel 25. It is also to be noted that the pinion 31 when not engaged by the teeth of wheel 30 is locked by the smooth periphery of this wheel, and so at this time locks the counter-wheel 33. In the same way the pinion 26 is locked by the smooth periphery of the wheel 25, and so at this time locks the counter-wheel 30.

From the foregoing description it will be seen that the visible counter-wheels are connected in a train of gearing so that a predetermined movement of one counter-wheel imparts movement to the next counter-wheel and that this train intermittently meshes and locks.

The visible counter-wheels may be variously arranged so as to alternately expose and obscure their characters. For example, each of them might be made in the form of a disk having an aperture which as the wheel rotates alternately exposes and obscures the counting characters fixed on a rear stationary plate, or the counting characters may be marked on the peripheries of the counter-wheels and exposed and obscured through windows on the face-plate; but the arrangement shown in the drawings is preferred. The snap action of the counter-wheels for the purpose of a register is a great utility, because it insures an accurate and ready reading of the register even by the unskilled.

It is to be noted that the arrangement of the driving-tooth 21 is such that even though the spring 23 should break, yet the mechanism would operate in substantially the same way as before, except there would be no snap movement.

While the various features are shown in the drawings in what is believed to be their best embodiment, yet it is to be understood that these features and their arrangement may be variously altered without departing from the scope of this invention. It is also to be understood that the train of gearing including wheels 13 and 18 and their connecting devices may be used wherever their function or mode of operation makes them useful, whether in a register or otherwise and without departing from the scope of this invention.

If desired, the mechanism for imparting snap movement may be arranged to operate on the thousands and tens-of-thousands spindles, the hundreds-spindle being geared in the ordinary way to work without snap movement. In this case the hundreds counter-wheel 25 would be omitted. This arrangement will be readily understood by those conversant with the art.

What I claim, and desire to secure by Letters Patent, is—

1. In a train of gearing, the combination of an intermittently-actuated driven wheel; means for intermittently locking and releasing said driven wheel; a spindle; and a driving-tooth intermittently meshing with said driven wheel and loosely mounted on said spindle so as to be capable of a partial rotation thereon.

2. In a train of gearing, the combination of an intermittently-actuated driven wheel; means for intermittently locking and releasing said driven wheel; a spindle; a driving-tooth intermittently meshing with said driven wheel and loosely mounted on said spindle so as to be capable of a partial rotation thereon; and a spring to bear on said tooth when the driven wheel is released.

3. In a train of gearing, the combination of an intermittently-actuated driven wheel; means for intermittently locking and releasing said driven wheel; a spindle; a driving-tooth intermittently meshing with said driven wheel and loosely mounted on said spindle so as to be capable of a partial rotation thereon; and a coiled spring having one end secured to said spindle and the other end secured to said tooth and arranged to be intermittently energized to bear on said tooth when the driven wheel is released.

4. In a train of gearing, the combination of an intermittently-actuated driven wheel; means for intermittently locking and releasing said driven wheel; a spindle; a driving-tooth intermittently meshing with said driven wheel and loosely mounted on said spindle so as to be capable of a partial rotation thereon; and a spring intermittently energized to bear on said tooth when the driven wheel is released.

5. In a train of gearing, the combination of an intermittently-actuated driven wheel;

a spindle; a wheel carried on said spindle for intermittently locking and releasing said driven wheel; and a spring-tooth for driving the driven wheel when the latter is released.

6. In a train of gearing, the combination of an intermittently-actuated driven wheel; a spindle; and a locking and releasing wheel loosely mounted on said spindle and arranged so that its periphery may engage and disengage the periphery of the driven wheel to lock and release the latter, said locking and releasing wheel having an independently-movable tooth to drive the driven wheel when the latter is released.

7. In a train of gearing, the combination of an intermittently-actuated driven wheel; a spindle; and a locking and releasing wheel loosely mounted on said spindle and arranged so that its periphery may engage and disengage the periphery of the driven wheel to lock and release the latter, said locking and releasing wheel having an independently-movable spring-tooth to drive the driven wheel when the latter is released.

8. In a train of gearing, the combination of an intermittently-actuated driven wheel; a spindle; a locking and releasing wheel loosely mounted on said spindle and arranged so that its periphery may engage and disengage the periphery of the driven wheel to lock and release the latter, said locking and releasing wheel having an independently-movable tooth to drive the driven wheel when the latter is released; and a spring to bear upon said tooth and arranged to be intermittently energized by the rotation of said spindle.

9. In a train of gearing, the combination of an intermittently-actuated driven wheel; a spindle; a locking and releasing wheel carried loosely on said spindle and having a periphery with a smooth portion and a recessed portion, said smooth portion engaging said driven wheel to lock it, and said recessed portion operating to release the driven wheel; and a tooth intermittently meshing with said driven wheel and carried loosely on said spindle, said tooth projecting from the recessed portion of said locking and releasing wheel and having an independent movement therein.

10. In a train of gearing, the combination of an intermittently-actuated driven wheel; a spindle; a locking and releasing wheel carried loosely on said spindle and having a periphery with a smooth portion and a recessed portion, said smooth portion engaging said driven wheel to lock it, and said recessed portion operating to release the driven wheel; a tooth intermittently meshing with said driven wheel and carried loosely on said spindle, said tooth projecting from the recessed portion of said locking and releasing wheel and having an independent movement therein; and a spring bearing on said tooth when said driven wheel is released.

11. In a train of gearing, the combination of an intermittently-actuated driven wheel; a spindle; a locking and releasing wheel carried loosely on said spindle and having a periphery with a smooth portion and a recessed portion, said smooth portion engaging said driven wheel to lock it, and said recessed portion operating to release the driven wheel; a tooth intermittently meshing with said driven wheel and carried loosely on said spindle, said tooth projecting from the recessed portion of said locking and releasing wheel and having an independent movement therein; and a wheel arranged to intermittently actuate said locking and releasing wheel.

12. In a train of gearing, the combination of an intermittently-actuated driven wheel; a spindle; a locking and releasing wheel carried loosely on said spindle and having a periphery with a smooth portion and a recessed portion, said smooth portion engaging said driven wheel to lock it, and said recessed portion operating to release the driven wheel; a tooth intermittently meshing with said driven wheel and carried loosely on said spindle, said tooth projecting from the recessed portion of said locking and releasing wheel and having an independent movement therein; a spring intermittently energized to bear on said tooth when said driven wheel is released; and a wheel arranged to intermittently actuate said locking and releasing wheel and energize said spring.

13. In a train of gearing, the combination of an intermittently-actuated driven wheel; means for intermittently locking and releasing said driven wheel; a spindle; a driving-tooth intermittently meshing with said driven wheel and loosely mounted on said spindle so as to be capable of a partial rotation thereon; and a train of snap-acting counter-wheels intermittently actuated by said driven wheel.

14. In a train of gearing, the combination of an intermittently-actuated driven wheel; means for intermittently locking and releasing said driven wheel; a spindle; a driving-tooth intermittently meshing with said driven wheel and loosely mounted on spindle so as to be capable of a partial rotation thereon; a coiled spring having one end secured to said spindle and the other end secured to said tooth and arranged to be intermittently energized to bear on said tooth when the driven wheel is released; and a train of snap-acting counter-wheels intermittently actuated by said driven wheel.

15. In a train of gearing, the combination of an intermittently-actuated driven wheel; a spindle; a wheel carried on said spindle for intermittently locking and releasing said driven wheel; a spring-tooth for driving the driven wheel when the latter is released; and a train of snap-acting counter-wheels intermittently actuated by said driven wheel.

16. In a train of gearing, the combination of an intermittently-actuated driven wheel; a spindle; a locking and releasing wheel loosely mounted on said spindle and arranged so that its periphery may engage and disengage the periphery of the driven wheel to lock and release the latter, said locking and releasing wheel having an independently-movable tooth to drive the driven wheel when the latter is released; and a train of snap-acting counter-wheels intermittently actuated by said driven wheel.

17. In a train of gearing, the combination of an intermittently-actuated driven wheel; a spindle; a locking and releasing wheel carried loosely on said spindle and having a periphery with a smooth portion and a recessed portion, said smooth portion engaging said driven wheel to lock it, and said recessed portion operating to release the driven wheel; a tooth intermittently meshing with said driven wheel and carried loosely on said spindle, said tooth projecting from the recessed portion of said locking and releasing wheel and having an independent movement therein; and a train of snap-acting counter-wheels intermittently actuated by said driven wheel.

18. In a train of gearing, the combination of an intermittently-actuated driven wheel; a spindle; a locking and releasing wheel carried loosely on said spindle and having a periphery with a smooth portion and a recessed portion, said smooth portion engaging said driven wheel to lock it, and said recessed portion operating to release the driven wheel; a tooth intermittently meshing with said driven wheel and carried loosely on said spindle, said tooth projecting from the recessed portion of said locking and releasing wheel and having an independent movement therein; a spring intermittently energized to bear on said tooth when said driven wheel is released; a wheel arranged to intermittently actuate said locking and releasing wheel and energize said spring; and a train of snap-acting counter-wheels intermittently actuated by said driven wheel.

In testimony whereof I have signed my name to this specification in the presence of two subscribing witnesses.

ALBERT R. BEAL.

Witnesses:
NICHOLAS M. GOODLETT, Jr.,
ELI J. BLAIR.